F. W. McLEAN.
SCRAPER.
APPLICATION FILED JUNE 6, 1908.
963,630. Patented July 5, 1910.
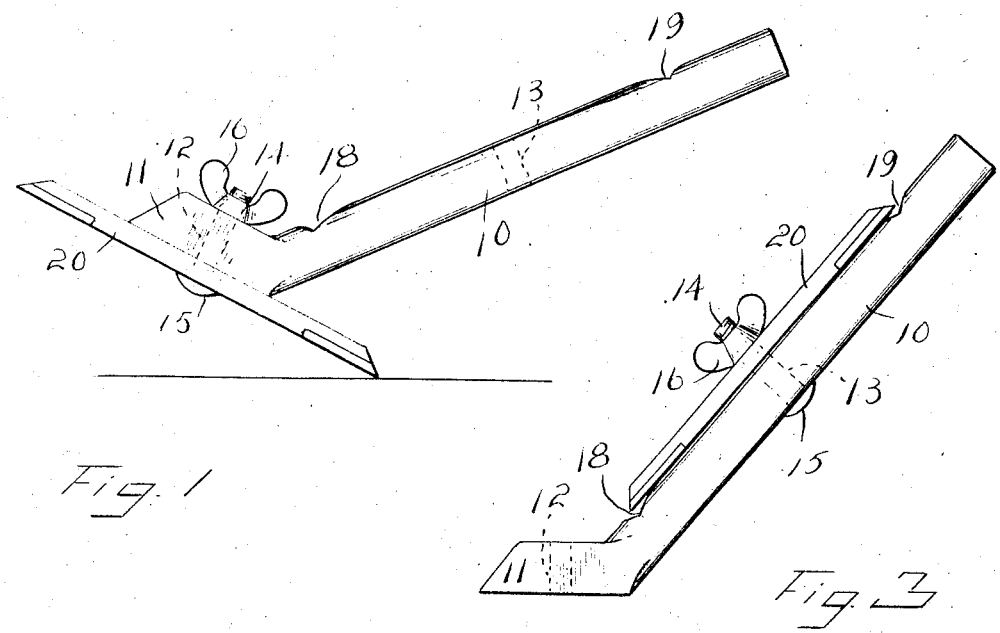
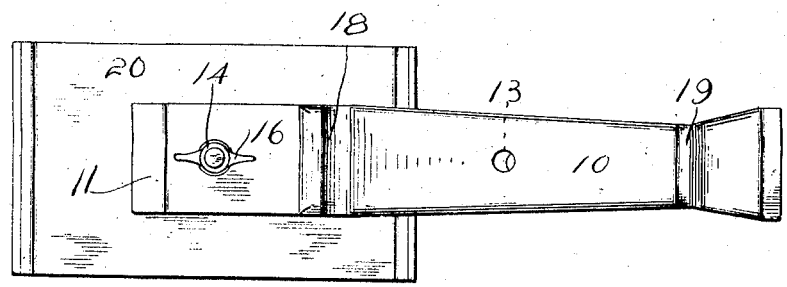
Witnesses
J. C. Simpson
M. J. Miller
Inventor
Frank W. McLean
By Chandler & Chandler
Attorneys

UNITED STATES PATENT OFFICE.

FRANK W. McLEAN, OF SHREVEPORT, LOUISIANA.

SCRAPER.

963,630.  Specification of Letters Patent.  Patented July 5, 1910.

Application filed June 6, 1908. Serial No. 437,106.

*To all whom it may concern:*

Be it known that I, FRANK W. MCLEAN, a citizen of the United States, residing at Shreveport, in the parish of Caddo, State of Louisiana, have invented certain new and useful Improvements in Scrapers; and I do hereby declare the following to be a full, clear, and exact description of the invention, such as will enable others skilled in the art to which it appertains to make and use the same.

This invention relates to combined working and shipping handles for scraper blades. It is a well understood fact that in devices of this character the central part of the blade is usually the most used and on this account it is customary to grind scraper blades so that the edge is slightly convex.

One object of the present invention is to provide a handle for scraper blades which will permit the blade being attached to the handle in such manner that the centers of the blade edges will be protected by said handle.

Another object of the invention is to provide the handle with an offset portion to which the scraper blade may be attached when the implement is in use, said offset portion having the further function of assisting in the protection of the blade edges by holding them raised from the surface on which the handle is deposited, in case the tool be laid with the blade downward when packed; this being accomplished by having the offset projecting from the side of the handle to which the blade is adapted to be attached.

A third object of the invention is to provide means whereby the handle and the cutting edges of the blade will be kept out of contact, one with the other, when the handle is being used to protect the blade.

With these and other objects in view the invention consists in certain novel features of construction hereafter shown and described and then specifically pointed out in the claim, and in the drawings illustrating the preferred embodiment of the invention, Figure 1 is a side elevation of the improved implement with the cutter applied to the outer end. Fig. 2 is a plan view. Fig. 3 is a side elevation of the cutter attached to the handle at an intermediate point, this being the position of the parts when not in use.

The improved device comprises a handle consisting of a body or stock 10 and a portion 11 extending obliquely to the longitudinal plane of the body portion, the oblique portion having a transverse aperture 12 while the body portion is provided with a like transverse aperture 13, the apertures designed to receive a clamp bolt 14 provided at one end with a head 15 and with a wing nut 16 operating at the opposite or threaded end. The upper face of the stock 10 is provided with recesses 18—19 spaced at equal distances from the apertures 13, the object to be hereafter explained.

The cutter is shown at 20 and comprises a rectangular steel plate having cutting edges at its opposite sides and formed by chamfering, as shown, and attached to the oblique portion 11 by the bolts 14, one edge of the plate projecting below the line of the oblique portion when in cutting position. By this arrangement the stock portion 10 projects at an angle to the longitudinal plane of the cutter plate, in convenient position to enable the cutter to be drawn in operative position over the surface to be scraped, as indicated in Fig. 1.

When the implement is not required for use the blade 20 and its bolt 14 are detached from the oblique portion 11 and the blade disposed with its rear face over the stock 10 opposite the aperture 13 and the bolt passed through the aperture in the blade and likewise through the aperture 13 in the stock, and the wing nut applied to the bolt, to clamp the parts firmly together. The cutting edges of the blade 20 come opposite the recesses 18—19 in the stock 10, and are thus prevented from coming in contact with the metal of the stock. The blade is thus protected from injury when not in use. By this means the cutter blade is protected from injury while being transported or while stored in the tool chest or other receptacle.

The blade 20 is provided with two cutting edges so that when one becomes dull the blade can be rotated to bring the opposite edge in operative position, this materially increasing the "life" of the cutter blade and requiring less delay for sharpening.

The stock and the cutter blade may be of any required size, and employed for any of the various purposes to which devices of this character are applicable.

The handle portion 10—11 may be of cast iron, malleable iron, cast steel, or other suitable material, the blade of tool steel suitably hardened, or the blade may have sections of tool steel welded thereto at the edges, if preferred.

The device is simple in construction, can be inexpensively manufactured, and may be applied to any of the various purposes for which implements of this class are employed.

What is claimed, is:—

In a combined working and shipping handle for scraper blades, a shank provided on one side with spaced notches, said shank being further provided with a bolt receiving aperture intermediate said notches and extending through the handle from the notched side to the side opposite thereto, an offset portion extending from the side containing said notches, said offset portion being provided with a bolt receiving aperture; in combination with a bolt adapted to fit either of said apertures, and a scraper blade having a centrally disposed aperture adapted to receive said bolt, said blade being provided with cutting edges at its ends and being of a length corresponding to the distance between the notches on the shank.

In testimony whereof, I affix my signature, in presence of two witnesses.

FRANK W. McLEAN.

Witnesses:
P. J. FOURCAULT,
E. W. RUSSELL.